United States Patent
Dolph et al.

(10) Patent No.: US 9,372,996 B2
(45) Date of Patent: Jun. 21, 2016

(54) PROTECTING DATA OWNED BY AN OPERATING SYSTEM IN A MULTI-OPERATING SYSTEM MOBILE ENVIRONMENT

(71) Applicant: INTERNATIONAL BUSINESS MACHINES CORPORATION, Armonk, NY (US)

(72) Inventors: Blaine H. Dolph, Western Springs, IL (US); Miku K. Jha, Fremont, CA (US); Sandeep R. Patil, Pune (IN); Riyazahamad M. Shiraguppi, Pune (IN); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 14/278,774

(22) Filed: May 15, 2014

(65) Prior Publication Data
US 2015/0332056 A1 Nov. 19, 2015

(51) Int. Cl.
*G06F 17/30* (2006.01)
*G06F 21/60* (2013.01)

(52) U.S. Cl.
CPC .......... *G06F 21/60* (2013.01); *G06F 17/30303* (2013.01)

(58) Field of Classification Search
CPC ....... G06F 21/12; G06F 21/60; G06F 21/105; G06F 21/121; G06F 21/50; G06F 21/57; G06F 21/572; G06F 21/575; G06F 21/10
USPC .............................. 726/26–30; 713/164, 193
See application file for complete search history.

(56) References Cited

U.S. PATENT DOCUMENTS 6,731,536 B1    5/2004  McClain et al.
6,986,052 B1 *  1/2006  Mittal .................. G06F 12/1441
                                                  711/E12.097

(Continued)

FOREIGN PATENT DOCUMENTS

EP      1365306    11/2003
EP      2034403    3/2009

(Continued)

OTHER PUBLICATIONS

Ramesh, KV; Web based multi operating system installation tool has install daemon that monitors for any new request submitted for OS installation, checks for lock files created and triggers installation scripts in the absense of lock file; Research Disclosures 2004RD-478059; Feb. 10, 2004; 2 pages.

(Continued)

*Primary Examiner* — Hosuk Song
(74) *Attorney, Agent, or Firm* — Schmeiser, Olsen & Watts; Lisa J. Ulrich

(57) ABSTRACT

An approach is provided for protecting data owned by an operating system on a mobile computing device having multiple operating systems. A map specifying protected data regions for the operating systems on the mobile computing device is generated. At least a portion of the map is secured with a shared key. Based on the map and the shared key, and in response to a data cleanup activity being performed by a software utility being executed on another, currently running operating system included in the multiple operating systems, a data region included in the protected data regions is determined to be owned by the operating system. Based on the data region being owned by the operating system and the data region being specified by the map, the data cleanup activity is blocked from being performed on the data region owned by the operating system.

17 Claims, 7 Drawing Sheets

(56) References Cited

U.S. PATENT DOCUMENTS

| | | | |
|---|---|---|---|
| 7,120,794 B2* | 10/2006 | Kelley | G06F 9/468 |
| | | | 713/164 |
| 7,398,389 B2* | 7/2008 | Teal | G06F 21/57 |
| | | | 713/164 |
| 8,239,667 B2 | 8/2012 | Durham | |
| 8,904,552 B2* | 12/2014 | Mo | G06F 21/57 |
| | | | 711/164 |
| 2006/0010314 A1 | 1/2006 | Xu | |
| 2009/0089569 A1 | 4/2009 | Baribault et al. | |
| 2011/0251992 A1 | 10/2011 | Bethlehem et al. | |
| 2012/0233612 A1 | 9/2012 | Beckett | |
| 2013/0219507 A1 | 8/2013 | Chang et al. | |

FOREIGN PATENT DOCUMENTS

| | | |
|---|---|---|
| JP | 2008146642 | 6/2008 |
| KR | 20060131296 | 12/2006 |

OTHER PUBLICATIONS

Aalto, Aleksi; Dynamic management of multiple operating systems in an embedded multi-core environment; Master's Thesis submitted in partial fulfillment of the requirement for the degree of Master of Science in Technolocy; AALto University, School of Science of Technology; Espoo, May 7, 2010; 69 pages.

Kanda, Wataru et al.; SIGMA System: A Multi-OS Environment for Embedded Systems; J Sign Process Syst (2010) 59:33-43; published online: Sep. 26, 2008.

Intel; Open and Secure Terminal Initiative 9OSTI) Architecture Specification (Revision 1.00); Intel Corporatoin and NTT DoCoMo, Inc.; Oct. 16, 2006; 17 pages.

Sun, Jun et al.; Supporting Multiple OSes with OS Switching; 2007 USENIX ANnual Technical Conference; Oct. 1, 2007; pp. 357-362.

* cited by examiner

PROTECTING DATA OWNED BY AN OPERATING SYSTEM IN A MULTI-OPERATING SYSTEM MOBILE ENVIRONMENT

TECHNICAL FIELD

The present invention relates to data protection, and more particularly to protecting operating system (OS) data in a multi-OS mobile computing device.

BACKGROUND

A mobile operating system is the operating system that is executed by a mobile device such as a smartphone, tablet, or personal digital assistant (PDA). Existing mobile OSs include Apple® iOS® offered by Apple, Inc. located in Cupertino, Calif.; Android® offered by Google Inc. located in Mountain View, Calif.; and Windows Phone 8® offered by Microsoft Corporation located in Redmond, Wash. Multiple mobile OSs can be installed on the same mobile device at the same time so that features of one installed mobile OS can be provided to the mobile device at one time and other features of another installed mobile OS can be provided at another time. Multiple OSs can execute on the same mobile device through the use of a Virtual Machine Monitor (VMM) (i.e., hypervisor) or OS switching. A VMM provides a virtual machine for each OS. OS switching exploits rapid suspend and resume capabilities of OSs to switch between different mobile OSs installed on the same mobile device. One mobile OS being switched out goes through a suspend process to enter a sleep mode, which saves critical portions of the system's state to system memory, but the hardware is not turned off. Instead, OS switching software boots or resumes a different mobile OS installed on the mobile device.

In a multi-OS mobile environment, one OS is not aware of the presence of another OS. Unlike a desktop computer in which disk space is sufficiently large to have separate partitions for each OS, a multi-OS mobile computing device has limited internal and external memory, and therefore the multiple OSs in the mobile computing device share space with each other. This shared space on the multi-OS mobile computing device is used to store OS-specific information, OS-specific sensitive data structures, and/or OS-specific user data. Executing certain utilities such as a file system data consistency check (e.g., the CHKDSK command) or an anti-virus tool on a currently running OS in the multi-OS mobile computing device scans data in memory to determine data that needs to be cleaned up, but the scan does not recognize data as being owned by another, non-running OS in the mobile computing device. By not recognizing certain data as being owned by the other OS, the utility mistakenly interprets that data as being unused data regions, bad data, or an unrecognized virus, and therefore may recommend that data be cleaned up (i.e., removed) or changed. If a user attempts to view the data that is recommended for cleanup, the data may appear to the user to be bad data or unrecognizable because the data, whose format is compatible with the other OS, may not be in user-readable form in the currently running OS. The data owned by the other OS can be removed by the currently running OS because each OS on the multi-OS mobile computing device has rights to control usage of all of the memory space. Locks generated by block locking or password-based block locking cannot protect against an unintended removal of data owned by the other OS because whichever OS that is currently running OS has master control over these locks. If the data owned by the other OS is subsequently removed based on the recommendation, and if the removed data is important for the operation of the other OS, then the user may not be able to run the other OS on the mobile computing device due to data corruption. In the multi-OS mobile environment, the mobile device running one of the multiple OSs has no way to differentiate between (1) malicious data, data not owned by any OS, or bad data and (2) data owned by another OS that needs to be protected from removal or change.

BRIEF SUMMARY

In first embodiments, the present invention provides a method of protecting data owned by an operating system on a mobile computing device having multiple operating systems. The method includes a computer generating a map specifying protected data regions for the operating systems on the mobile computing device. The method further includes the computer securing at least a portion of the map with a shared key. The method further includes, based on the map and the shared key, and in response to a data cleanup activity being performed by a software utility being executed on another, currently running operating system included in the multiple operating systems, the computer determining a data region included in the protected data regions is owned by the operating system. The method further includes, based on the data region being owned by the operating system and the data region being specified by the map, the computer blocking the data cleanup activity from being performed on the data region owned by the operating system.

In second embodiments, the present invention provides a computer program product, including a computer-readable, storage device; and a computer-readable program code stored in the computer-readable, storage device. The computer-readable program code contains instructions that are carried out by a central processing unit (CPU) of a computer system to implement a method of protecting data owned by an operating system on a mobile computing device having multiple operating systems. The method includes the computer system generating a map specifying protected data regions for the operating systems on the mobile computing device. The method further includes the computer system securing at least a portion of the map with a shared key. The method further includes based at least in part on the map and the shared key, and in response to a data cleanup activity being performed by a software utility being executed on another, currently running operating system included in the multiple operating systems, the computer system determining a data region included in the protected data regions is owned by the operating system. The method further includes based on the data region being owned by the operating system and the data region being specified by the map, the computer system blocking the data cleanup activity from being performed on the data region owned by the operating system.

In third embodiments, the present invention provides a computer system including a central processing unit (CPU), a memory coupled to the CPU, and a computer readable storage device coupled to the CPU. The storage device contains instructions that are executed by the CPU via the memory to implement a method of protecting data owned by an operating system on a mobile computing device having multiple operating systems. The method includes the computer system generating a map specifying protected data regions for the operating systems on the mobile computing device. The method further includes the computer system securing at least a portion of the map with a shared key. The method further includes based at least in part on the map and the shared key, and in response to a data cleanup activity being performed by a software utility being executed on another, currently running operating system included in the multiple operating systems, the computer system determining a data region included in the protected data regions is owned by the operating system, the software utility being executed on another, currently running operating system included in the multiple operating systems. The method further includes based on the data region being owned by the operating system and the data region being specified by the map, the computer system blocking the data cleanup activity from being performed on the data region owned by the operating system.

Embodiments of the present invention makes a currently running OS in a multi-OS mobile environment aware of another OS and important or sensitive data owned by the other OS, thereby protecting data owned by the other OS from deletion by a data cleanup activity performed via the currently running OS. Embodiments of the present invention provide a technique by which the currently running OS can differentiate between actual malicious or bad data or unused data regions and data that belongs to the other OS.

DETAILED DESCRIPTION

Overview

Embodiments of the present invention protect important or sensitive data owned by a first OS from unintentional deletion or damage by a data cleanup activity performed via a second OS, where the first and second OSs are included in multiple OSs installed on a mobile computing device. The protection of the important or sensitive data owned by the first OS prevents data corruption that causes the first OS to be inoperable when it is subsequently booted or resumed. Embodiments of the present invention make each OS in a multi-OS mobile environment aware of the presence of other OSs and each OS protects its own data regions using its own protection key. Each OS maintains a corresponding map of data regions that include data that are important or sensitive and therefore need to be protected from unintentional deletion or damage. Each map is available to other OSs via a shared key that grants read-only access. Whenever a currently running OS detects a data region in memory as apparently being not owned by the currently running OS, where the detection of the data region is part of an ongoing data cleanup activity, the OS consults each map of protected data regions to determine if the detected data region is a protected data region (i.e., protected by one of the other OSs). If the detected region is a protected data region according to the map, the detected data region is skipped during the cleanup activity.

Figure 1:
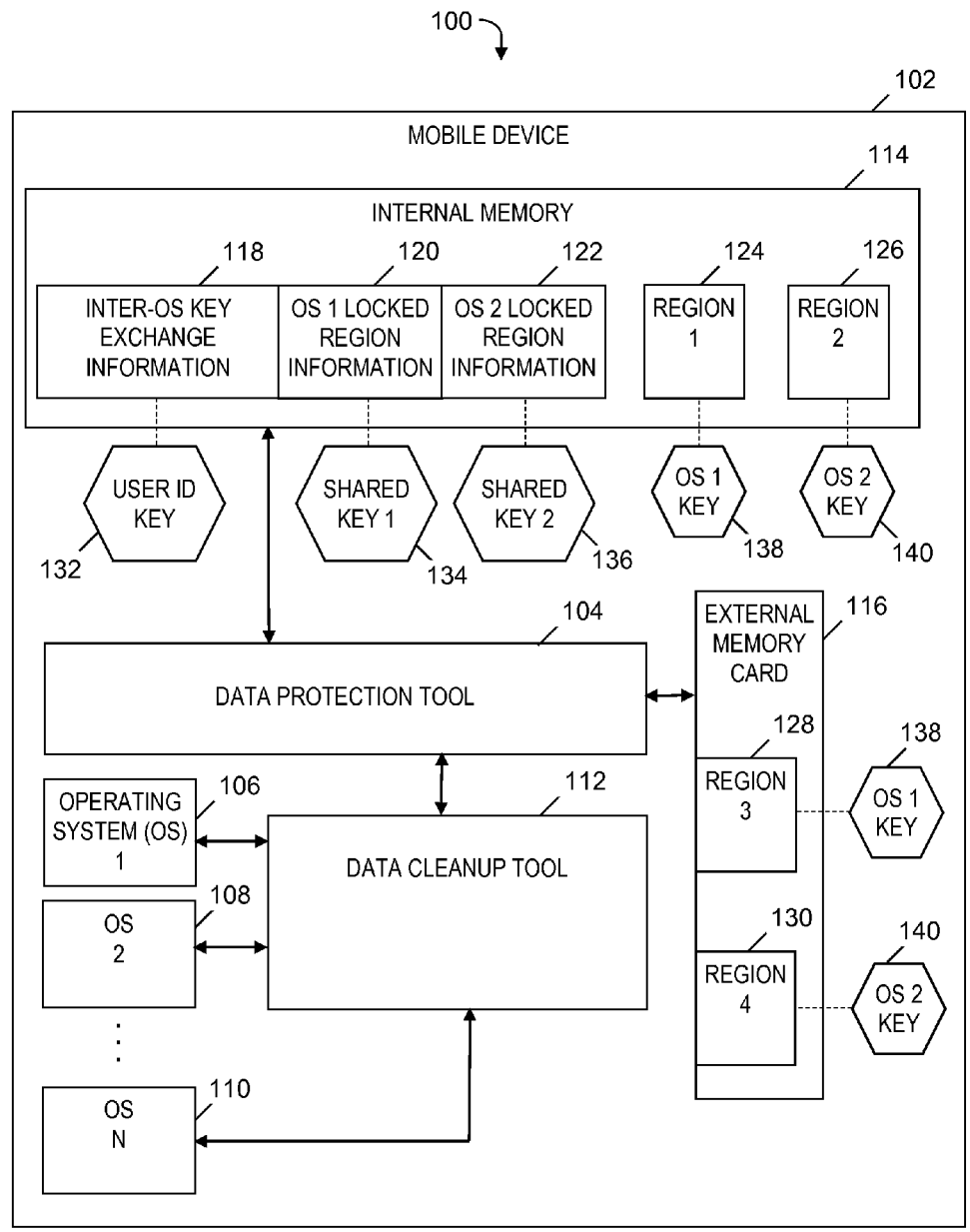
FIG. 1 is a block diagram of a system for protecting data owned by an operating system on a mobile computing device having multiple operating systems, in accordance with embodiments of the present invention.

System for Protecting Data Owned by an Operating System in a Multi-Operating System Mobile Environment FIG. 1 is a block diagram of a system 100 for protecting data owned by an operating system on a mobile computing device having multiple operating systems, in accordance with embodiments of the present invention. System 100 includes mobile computing device 102 (also known as (a.k.a.) mobile device) which runs a software-based data protection tool 104, and multiple operating systems OS 1, OS 2, . . . , OS N (i.e., OS 106, OS 108, . . . , OS 110), where N is an integer greater than or equal to two. Mobile device 102 uses OS switching to switch its currently running OS among OS 1, OS 2, . . . , OS N. Mobile computing device 102 also runs a software-based data cleanup tool 112 which performs a modification or a cleanup (i.e., deletion) of data in an internal memory 114 of mobile device 102 and/or data in an external memory card 116 that is installed in mobile device 102. In one embodiment, external memory card 116 is a Secure Digital (SD) memory card.

Internal memory 114 stores an inter-OS key exchange information 118 at a fixed location. The size of inter-OS key exchange information 118 is sufficient to store N shared keys for OS 1, OS 2, . . . , OS N (i.e., OS 106, OS 108, . . . , OS 110) in a one-to-one correspondence, memory offsets for respective locked region information sections for OS 1, OS 2, . . . , OS N, and a length of each shared key. In one embodiment, the maximum size of the section of internal memory 114 storing inter-OS key exchange information 118 is 512 bytes.

Internal memory 114 stores an OS 1 locked region information section 120 and an OS 2 locked region information section 122, which include maps of protected data regions for OS 1 and OS 2, respectively; i.e., information specifying the locations of protected data regions for OS 1 and OS 2, respectively. In addition to locked region information for OS 1 and OS 2, internal memory 114 stores locked region information (not shown) for any other OS of the N OSs installed in mobile device 102, if N>2. Each OS locked region information includes one or more tuples, where the form of a tuple is: (1) Disk identifier (ID) which identifies whether the data region is on internal memory 114 or external memory card 116, (2) a location in memory that starts the data region being protected, and (3) a location in memory that ends the data region being protected. The size of each OS locked region information is fixed at a predetermined size, which restricts the number of data regions that can be protected by each OS installed in mobile device 102.

Internal memory 114 includes data region 124 and data region 126 and external memory card 116 includes data region 128 and data region 130. Data regions 124 and 128 include data owned by OS 1 (i.e., OS 106), which is being protected by data protection tool 104. Data regions 126 and 130 include data owned by OS 2 (i.e., OS 108), which is being protected by data protection tool 104.

A user ID key 132 is a key generated based on biometric identification or a unique number or code that identifies a user or owner of mobile device 102, and is independent of the OS that is currently running in mobile device 102. For example, the user ID key 132 is a password provided by the user of mobile device 102.

A shared key 134 (i.e., shared key 1) and a shared key 136 (i.e., shared key 2) are keys that allow a currently running OS to have read-only access to OS 1 locked region information 120 and OS 2 locked region information 122, respectively. OS 2 uses shared key 1 to have read-only access to OS 1 locked region information 120. OS 1 uses shared key 2 to have read-only access to OS 2 locked region information 122. Each OS has a respective write key (not shown) which allows the OS to have write access to that OS's locked region information. For example, an OS 1 write key (not shown) allows OS 1 to have write access to OS 1 locked region information 120. Asymmetric key mechanisms such as public-private key can be used to generate the write keys and the shared keys. The write keys provide private key encryption and the shared keys provide public key decryption.

OS 106 generates an OS 1 key 138. OS 108 generates an OS 2 key 140. OS 1 key 138 locks data regions 124 and 128 and indicates data regions 124 and 128 need to be protected from unintentional deletion or damage by OS(s) other than OS 1. OS 2 key 140 locks data regions 126 and 130 and indicates that data regions 126 and 130 need to be protected from unintentional deletion or damage by OS(s) other than OS 108.

In one embodiment, each OS installed in mobile device 102 uses encryption passwords so that encryption keys are used to represent OS-specific keys to lock data regions in mobile device 102, and also uses block level locking (e.g., provided by Common Flash Memory Interface and command sets) to protect its data regions with the OS-specific keys. For example, OS 106 uses block level locking to protect data regions 124 and 128 with OS 1 key 138. In another embodiment, each OS installed in mobile device 102 uses the aforementioned encryption passwords and password-based erase-protection commands to protect its data regions with OS-specific keys.

The functionality of the components shown in FIG. 1 is described in more detail in the discussions of FIG. 2, FIG. 3, FIGS. 4, FIGS. 5A-5B and FIG. 7 presented below.

Figure 2:
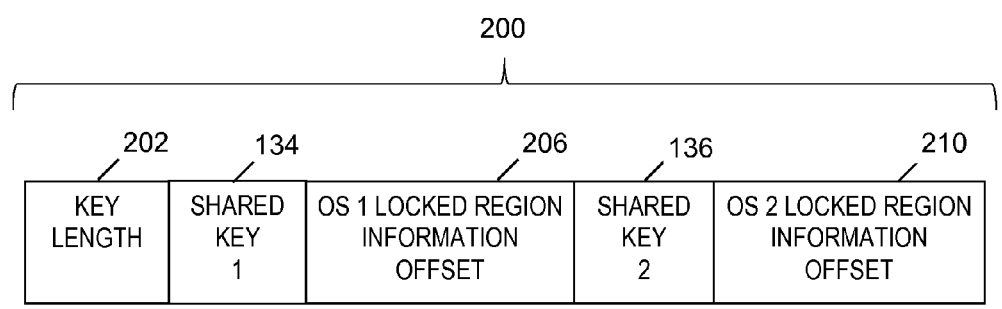
FIG. 2 is a data structure of an inter-OS key exchange information section included in the system of FIG. 1, in accordance with embodiments of the present invention.

FIG. 2 is a data structure 200 of an inter-OS key exchange information section included in the system of FIG. 1, in accordance with embodiments of the present invention. Data structure 200 includes a key length 202, OS 1 key 138, an OS 1 locked region information offset 206, OS 2 key 140, and an OS 2 locked region information offset 210. Key length 202 indicates the length of OS 1 key 138 and OS 2 key 140. Again, OS 1 key 138 locks data region 124 (see FIG. 1) and data region 128 (see FIG. 1) and indicates data regions 124 and 128 (see FIG. 1) include important or sensitive data owned by OS 1 that needs to be protected from unintentional deletion or damage by OS(s) other than OS 1. Again, OS 2 key 140 locks data region 126 (see FIG. 1) and data region 130 (see FIG. 1) and indicates data regions 126 and 130 (see FIG. 1) include important or sensitive data owned by OS 2 that needs to be protected from unintentional deletion or damage by OS(s) other than OS 2. OS 1 locked region information offset 206 includes the offset in internal memory 114 (see FIG. 1) of each OS locked region (i.e., OS 1 locked region information 120 (see FIG. 1) and OS 2 locked region information 122 (see FIG. 1)) stored in internal memory 114 (see FIG. 1).

Figure 3:
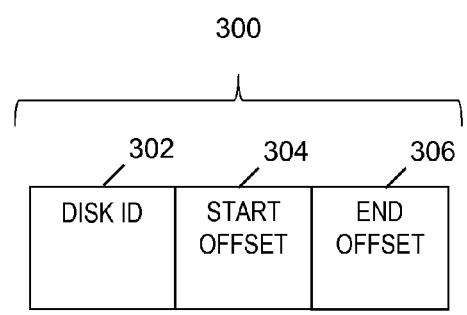
FIG. 3 is a data structure of an OS locked region information tuple included in the system of FIG. 1, in accordance with embodiments of the present invention.

FIG. 3 is a data structure 300 of an OS locked region information tuple included in the system of FIG. 1, in accordance with embodiments of the present invention. Each OS locked region information specified in the inter-OS key exchange information 116 (see FIG. 1) includes one or more tuples having the format shown in data structure 300. Data structure 300 includes a disk ID 302, a start offset 304 and an end offset 306. Disk ID 302 identifies whether the data region specified by data structure 300 is stored on internal memory 114 (see FIG. 1) or on external memory card 116 (see FIG. 1). Start offset 304 and end offset 306 indicate the memory locations at the start and end, respectively, of the data region that includes data owned by an OS installed on mobile device 102 (see FIG. 1) and that is being protected from unintentional deletion or damage by a data cleanup activity performed via another OS installed on mobile device 102 (see FIG. 1).

Figure 4:
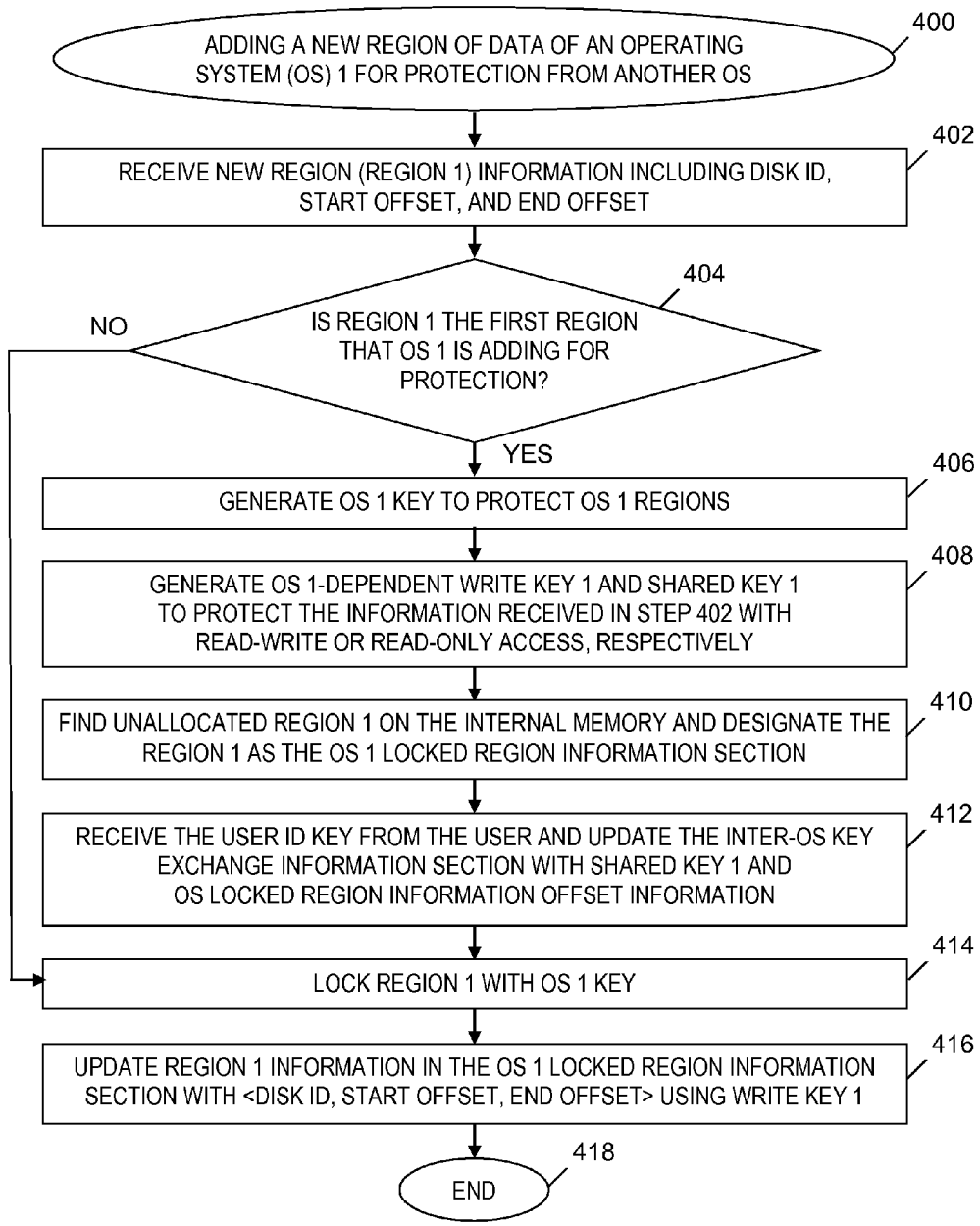
FIG. 4 is a flowchart of a process for adding a new region of data of an operating system for protection from removal by another operating system, where the process is implemented in the system of FIG. 1, in accordance with embodiments of the present invention.

Process for Protecting Data Owned by an Operating System in a Multi-Operating System Mobile Environment FIG. 4 is a flowchart of a process for adding a new region of data of an operating system for protection from deletion or damage by another operating system, where the process is implemented in the system of FIG. 1, in accordance with embodiments of the present invention. Periodically, or in response to an initiation of a shutdown or a suspension of OS 106 (see FIG. 1), OS 106 (see FIG. 1) determines one or more new data regions in internal memory 114 (see FIG. 1) or external memory card 116 (see FIG. 1) that are to be protected from unintentional deletion or damage by a data cleanup performed via OS 108 (see FIG. 1) or any other OS installed in mobile device 102. Each of the one or more data regions determined by OS 106 (see FIG. 1) is added for protection using the process of FIG. 4.

The process of FIG. 4 starts at step 400. In step 402, data protection tool 104 (see FIG. 1) receives information specifying a new data region, which includes data owned by OS 106 (see FIG. 1) and that is to be protected from unintentional deletion or damage by a data cleanup activity performed by another OS (i.e., OS 108, . . . , or OS 110 in FIG. 1) installed in mobile device 102 (see FIG. 1). The information received in step 402 includes a disk ID indicating whether the new data region is stored in internal memory 114 (see FIG. 1) or in external memory card 116 (see FIG. 1), and start and end offsets, which indicate the start and end memory locations, respectively, of the new data region.

In step 404, data protection tool 104 (see FIG. 1) determines whether the new data region is the first data region that OS 106 (see FIG. 1) is adding for protection (i.e., designating as being protected from unintentional deletion or damage by a data cleanup activity performed by another OS installed in mobile device 102 (see FIG. 1)). If data protection tool 104 (see FIG. 1) determines in step 404 that the new data region is the first data region that OS 106 (see FIG. 1) is adding for protection, then the Yes branch of step 404 is taken and step 406 is performed.

In step 406, data protection tool 104 (see FIG. 1) generates OS 1 key 138 (see FIG. 1) to protect the new data region from unintentional deletion or damage by a data cleanup activity performed by another OS installed in mobile device 102 (see FIG. 1). OS 1 key 138 (see FIG. 1) also protects any other data region(s) that are subsequently added for protection by OS 106 (see FIG. 1).

In step 408, data protection tool 104 (see FIG. 1) generates an OS 1-dependent write key and OS 1-dependent shared key 134 (see FIG. 1), which protect the information received in step 402 with read-write access and read-only access, respectively, after the aforementioned information is stored in the OS 1 locked region information section 120 (see FIG. 1), which is discussed below relative to step 416.

In step 410, data protection tool 104 (see FIG. 1) finds an unallocated region in internal memory 114 (see FIG. 1) and designates the found region as the OS 1 locked region information section 120 (see FIG. 1).

In step 412, data protection tool 104 (see FIG. 1) receives the user ID key 132 (see FIG. 1) from a user of mobile device 102 (see FIG. 1) and updates the inter-OS key exchange information section 118 (see FIG. 1) to add the shared key generated in step 408 and to add offset information that indicates the start and end memory locations of the OS 1 locked region information section 120 (see FIG. 1), which was designated in step 410.

In step 414, data protection tool 104 (see FIG. 1) locks the new data region with the OS 1 key 138 (see FIG. 1), which was generated in step 406.

In step 416, data protection tool 104 (see FIG. 1) updates information in OS 1 locked region information section 120 (see FIG. 1), where the updated information is information about the new data region that is updated with a tuple <Disk ID, start offset, end offset>. The disk ID, start offset, and end offset in the tuple were included in the information received in step 402. The tuple is stored in data structure 300 (see FIG. 3) within OS 1 locked region information section 120 (see FIG. 1). Data protection tool 104 (see FIG. 1) uses the write key generated in step 408 to perform the update of OS 1 locked region information section 120 (see FIG. 1) in step 416. After step 416, the process of FIG. 4 ends at step 418.

Returning to step 404, if data protection tool 104 (see FIG. 1) determines that the new data region is not the first data region that OS 106 (see FIG. 1) is adding for protection, then the No branch is taken and the process continues with step 414, which is described above.

Figure 5A:
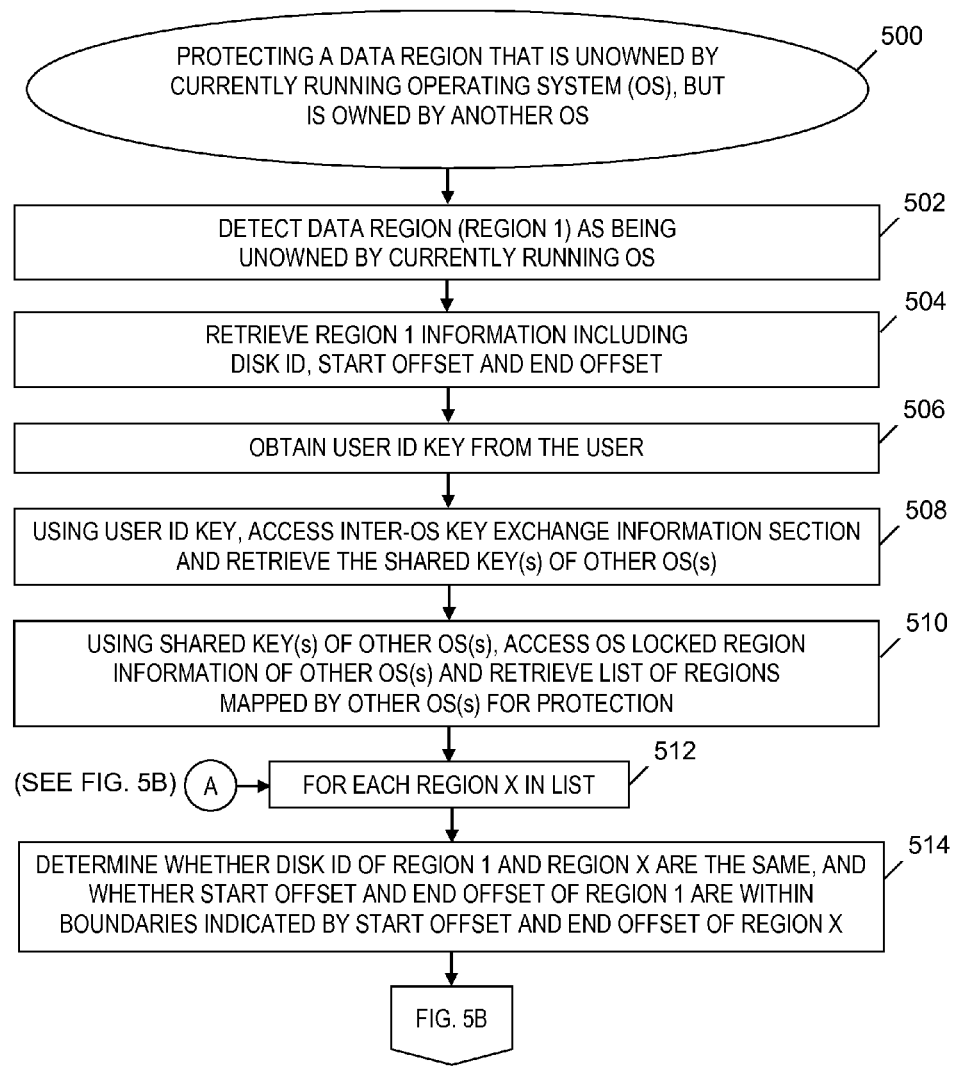
FIGS. 5A-5B is a flowchart of a process for protecting a data region that is not owned by a currently running operating system, but is owned by another operating system, where the process is implemented in the system of FIG. 1, in accordance with embodiments of the present invention.
Figure 5B:
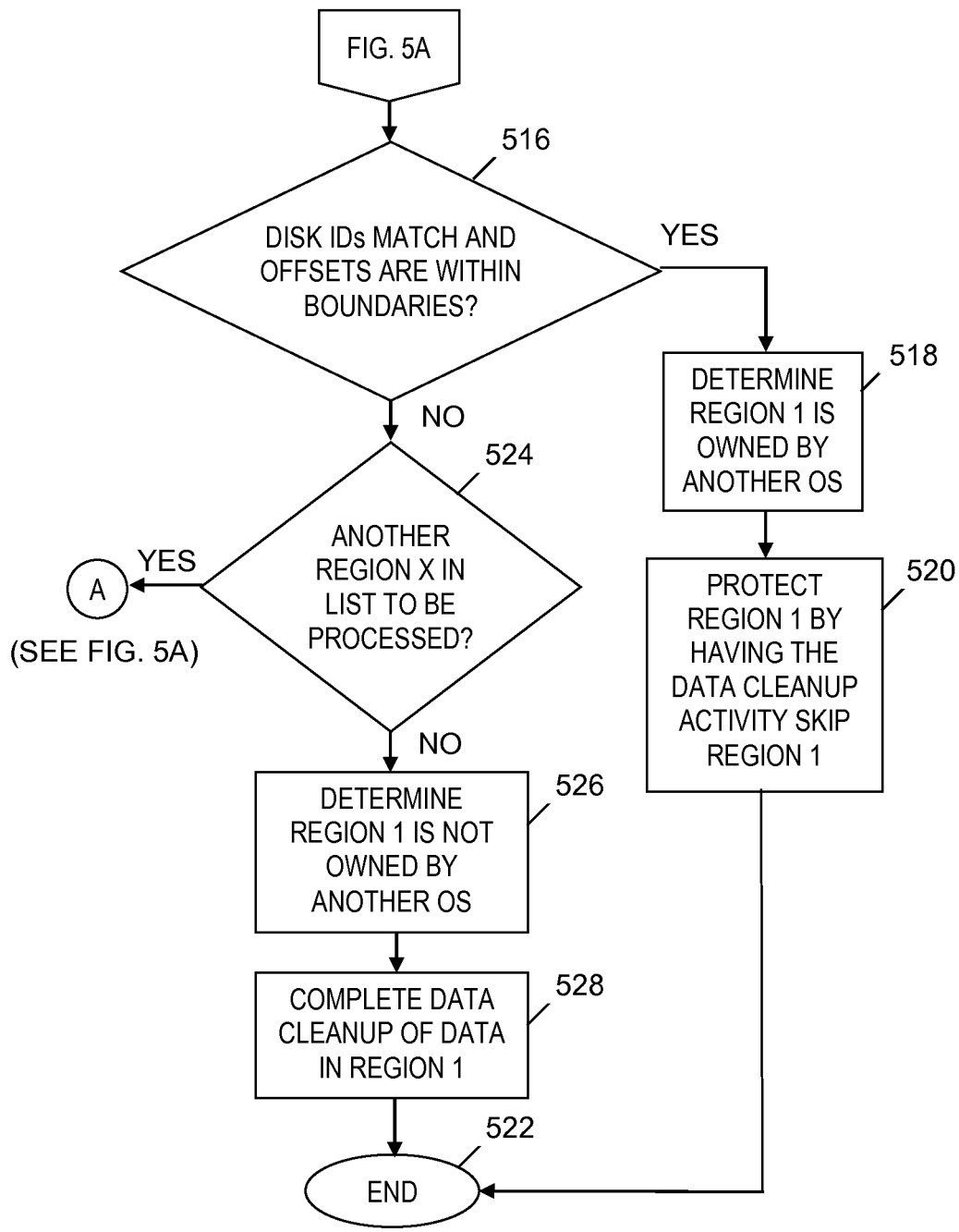

FIGS. 5A-5B is a flowchart of a process for protecting a data region that is not owned by a currently running operating system, but is owned by another operating system, where the process is implemented in the system of FIG. 1, in accordance with embodiments of the present invention. The process of FIGS. 5A-5B starts at step 500 in FIG. 5A. Prior to step 502, data cleanup tool 112 (see FIG. 1) initiates a data cleanup activity that includes scanning data regions in internal memory 114 (see FIG. 1) and external memory card 116 (see FIG. 1) to identify data regions that are candidates for a data cleanup. The candidate data regions are those data regions that are not owned by the OS that is currently running in mobile device 102 (see FIG. 1) (hereinafter, "the currently running OS"). In step 502, data protection tool 104 (see FIG. 1) receives an indication from data cleanup tool 112 (see FIG. 1) that a data region in internal memory 114 (see FIG. 1) or external memory card 116 (see FIG. 1) is detected as being not owned by the currently running OS.

In step 504, data protection tool 104 (see FIG. 1) retrieves information about the data region detected in step 502. The retrieved information includes a disk ID identifying whether the detected data region is in internal memory 114 (see FIG. 1) or in external memory card 116 (see FIG. 1), and start and end offsets that indicate the memory locations at which the detected data region starts and ends, respectively.

In step 506, data protection tool 104 (see FIG. 1) obtains the user ID key 132 (see FIG. 1) from the user of mobile device 102 (see FIG. 1).

In step 508, using the obtained user ID key 132 (see FIG. 1), data protection tool 104 (see FIG. 1) accesses and retrieves from inter-OS key exchange information section 118 (see FIG. 1) the shared key(s) of other OS(s) (i.e., other than the currently running OS) installed in mobile device 102 (see FIG. 1). For example, if the currently running OS is OS 108 (see FIG. 1) (i.e., OS 2), then in step 508, data protection tool 104 (see FIG. 1) retrieves shared key 134 (i.e., the OS 1-dependent shared key) from inter-OS key exchange information section 118 (see FIG. 1).

In step 510, using the shared key(s) retrieved in step 508, data protection tool 104 (see FIG. 1) accesses and retrieves from OS locked region information sections of other OS(s) a list of data regions mapped by the other OS(s) for protection. For example, if the currently running OS is OS 108 (see FIG. 1) (i.e., OS 2), then in step 510, data protection tool 104 (see FIG. 1) retrieves a list that includes data region 124 (see FIG. 1) and data region 128 (see FIG. 1), which are the data regions that OS 106 (see FIG. 1) designated as being protected from unintentional deletion or damage by a data cleanup activity performed by OS 108 (see FIG. 1).

In step 512, a loop begins that processes each data region (hereinafter, "data region X") in the list retrieved in step 510. In step 512, data protection tool 104 (see FIG. 1) determines the disk ID identifying whether data region X is in internal memory 114 (see FIG. 1) or in external memory card 116 (see FIG. 1), and the start and end offsets indicating the memory locations at which the data region starts and ends, respectively.

In step 514, data protection tool 104 (see FIG. 1) determines whether the disk ID of the data region detected in step 502 matches the disk ID of data region X, and whether the start and end offsets of the data region detected in step 502 are within the boundaries indicated by the start and end offsets of region X. After step 514, the process of FIGS. 5A-5B continues with step 516 in FIG. 5B.

In step 516, if data protection tool 104 (see FIG. 1) determined in step 514 (see FIG. 5A) that the aforementioned disk IDs match and that the start and end offsets of the data region detected in step 502 are within the boundaries indicated by the start and end offsets of data region X, then the Yes branch of step 516 is taken and step 518 is performed.

In step 518, data protection tool 104 (see FIG. 1) determines that the data region detected in step 502 (see FIG. 5A) is owned by an OS installed in mobile device 102 (see FIG. 1) other than the currently running OS.

In step 520, data protection tool 104 (see FIG. 1) protects the data region detected in step 502 (see FIG. 5A) by preventing the detected data region from being deleted or damaged by the data cleanup activity being performed by data cleanup tool 112 (see FIG. 1) via the currently running OS. That is, the data cleanup activity being performed by data cleanup tool 112 (see FIG. 1) skips the data region detected in step 502 (see FIG. 5A). After step 520, the process of FIGS. 5A-5B ends at step 522.

Returning to step 516, if data protection tool 104 (see FIG. 1) determined in step 514 (see FIG. 5A) that the aforementioned disk IDs do not match each other or that the start and end offsets of the data region detected in step 502 are not within the boundaries indicated by the start and end offsets of data region X, then the No branch of step 516 is taken and step 524 is performed.

In step 524, data protection tool 104 (see FIG. 1) determines whether another data region X is in the list retrieved in step 510 (see FIG. 5A) which has not been processed in the loop that started at step 512 (see FIG. 5A). If data protection tool 104 (see FIG. 1) determines in step 524 that another data region X in the aforementioned list has not yet been processed in the aforementioned loop, then the Yes branch of step 524 is taken, and the next iteration of the loop begins at step 512 (see FIG. 5A). If data protection tool 104 (see FIG. 1) determines in step 524 that there is not another data region X in the aforementioned list that is unprocessed by the loop starting at step 512 (see FIG. 5A), then the No branch of step 524 is taken and step 526 is performed. In step 526, data protection tool 104 (see FIG. 1) determines that the data region detected in step 502 (see FIG. 5A) is not owned (or not designated as being protected) by another OS (i.e., an OS other than the currently running OS) installed in mobile device 102 (see FIG. 1).

In step 528, based on the data region detected in step 502 (see FIG. 5A) not being owned by another OS, data protection tool 104 (see FIG. 1) completes the data cleanup of the detected data region. After step 528, the process of FIGS. 5A-5B ends at step 522.

EXAMPLE

Figure 6:
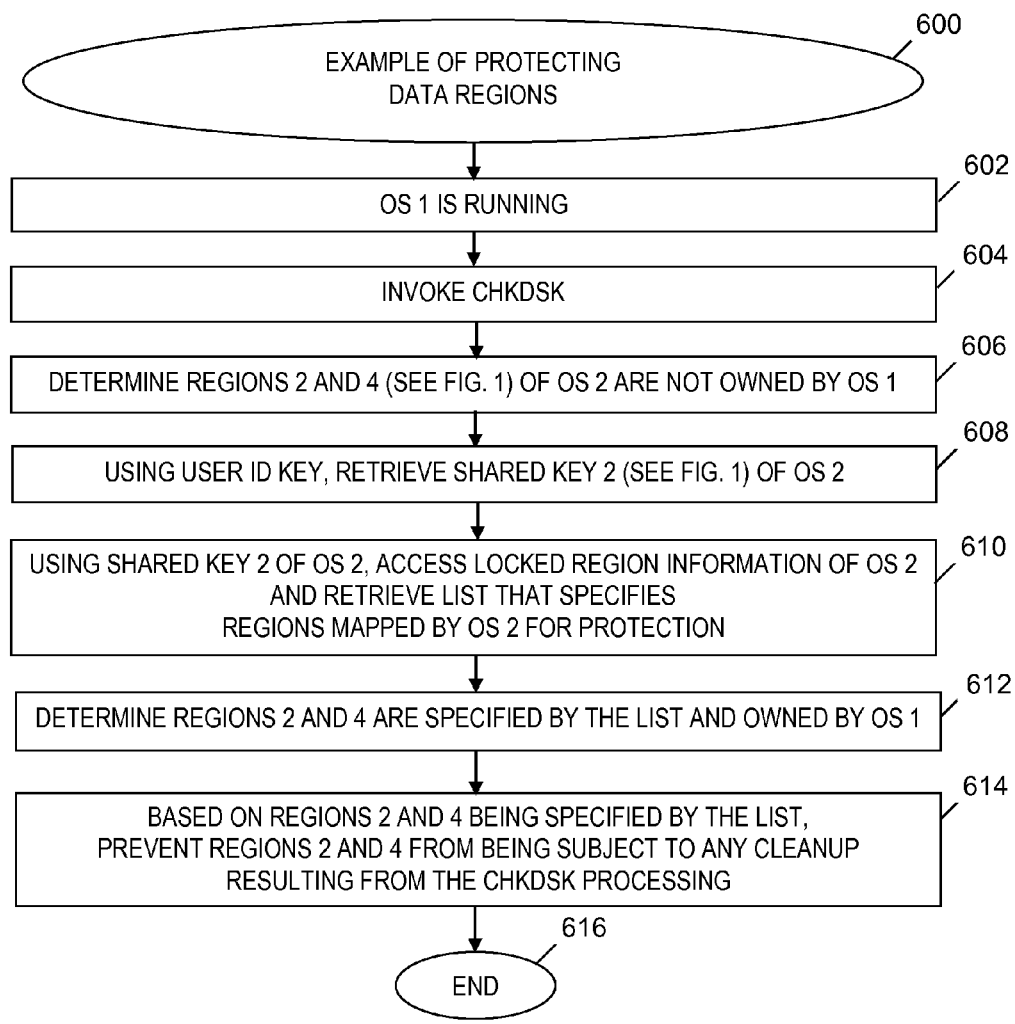
FIG. 6 is an example of protecting data regions using the process of FIGS. 5A-5B, in accordance with embodiments of the present invention.

FIG. 6 is an example of protecting data regions using the process of FIGS. 5A-5B, in accordance with embodiments of the present invention. The example of FIG. 6 starts at step 600. In step 602, OS 106 (see FIG. 1) (i.e., OS 1 in FIG. 1) is the currently running OS in mobile device 102 (see FIG. 1). In step 604, as part of a data cleanup activity, data cleanup tool 112 (see FIG. 1) invokes the CHKDSK command to check and display the file system integrity status of internal memory 114 (see FIG. 1) and external memory card 116 (see FIG. 1).

In step 606, data protection tool 104 (see FIG. 1) determines data region 126 (see FIG. 1) (i.e., data region 2 in FIG. 1) and data region 130 (see FIG. 1) (i.e., data region 4 in FIG. 1) are not owned by the currently running OS 1. Step 606 is an example of step 502 (see FIG. 5A).

In step 608, using user ID key 132 (see FIG. 1), data protection tool 104 (see FIG. 1) retrieves the shared key 136 (see FIG. 1 or FIG. 2) (i.e., shared key 2) of OS 108 (see FIG. 1) (i.e., OS 2), where the retrieved shared key 2 provides read-only access to OS 2 locked region information section 122 (see FIG. 1).

In step 610, using shared key 2, data protection tool 104 (see FIG. 1) accesses and retrieves from OS 2 locked region information 122 (see FIG. 1) a list that specifies data regions mapped by OS 2 for protection from unintentional deletion or damage by the data cleanup activity being performed via OS 1.

In step 612, data protection tool 104 (see FIG. 1) determines that data regions 2 and 4 are specified by the list retrieved in step 610 and are owned by OS 1.

In step 614, based on data regions 2 and 4 being specified by the list retrieved in step 610, data protection tool 104 (see FIG. 1) prevents data regions 2 and 4 from being subject to any cleanup resulting from the processing by the CHKDSK command. After step 614, the process of FIG. 6 ends at step 616.

Computer System

Figure 7:
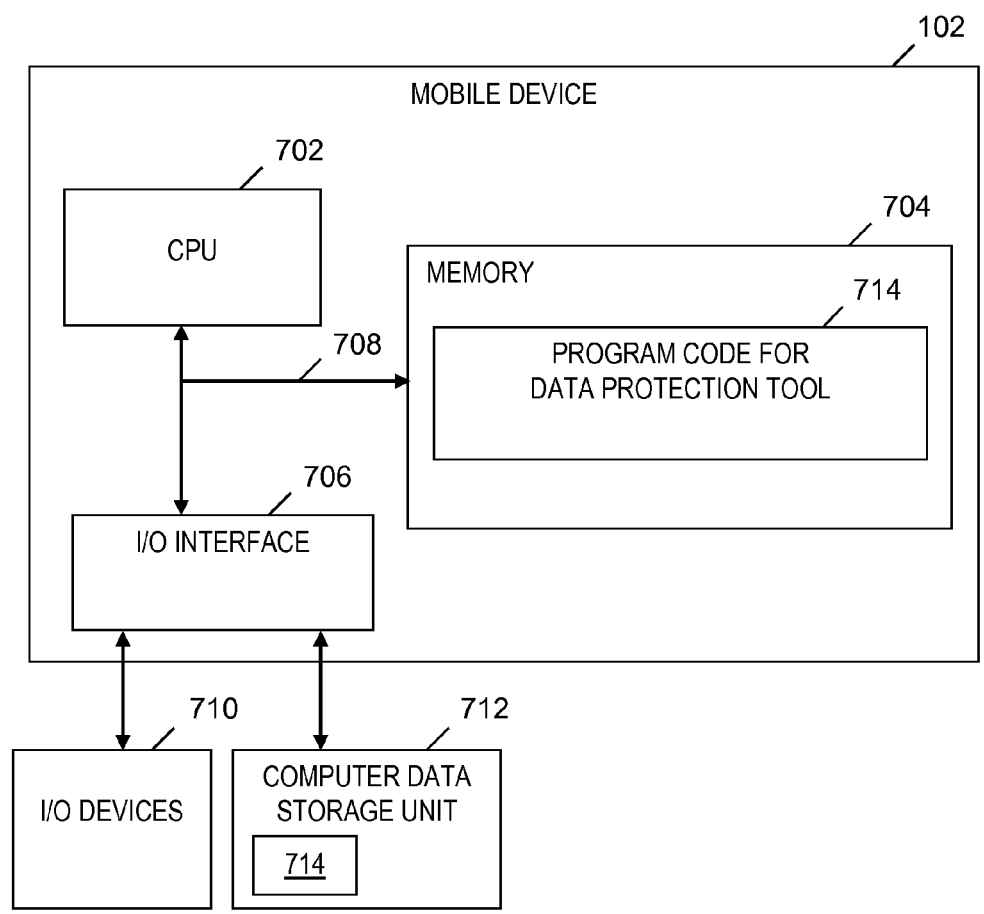
FIG. 7 is a block diagram of a mobile device included in the system of FIG. 1 and that implements the processes of FIG. 4 and FIGS. 5A-5B, in accordance with embodiments of the present invention.

FIG. 7 is a block diagram of a mobile device included in the system of FIG. 1 and that implements the processes of FIG. 4 and FIGS. 5A-5B, in accordance with embodiments of the present invention. Mobile device 102 is a mobile computing device or computer system that generally includes a central processing unit (CPU) 702, a memory 704, an input/output (I/O) interface 706, and a bus 708. Further, mobile device 102 is coupled to I/O devices 710 and a computer data storage unit 712. CPU 702 performs computation and control functions of mobile device 102, including carrying out instructions included in program code 714 to perform a method of protecting data owned by an operating system on mobile device 102 having multiple operating systems, where the instructions are carried out by CPU 702 via memory 704. CPU 702 may include a single processing unit, or be distributed across one or more processing units in one or more locations (e.g., on a client and server). Program code 714 includes program code for data protection tool 104 (see FIG. 1) and data cleanup tool 112 (see FIG. 1).

Memory 704 includes a known computer readable storage medium, which is described below. In one embodiment, cache memory elements of memory 704 provide temporary storage of at least some program code (e.g., program code 714) in order to reduce the number of times code must be retrieved from bulk storage while instructions of the program code are carried out. Moreover, similar to CPU 702, memory 704 may reside at a single physical location, including one or more types of data storage, or be distributed across a plurality of physical systems in various forms. Further, memory 704 can include data distributed across, for example, a local area network (LAN) or a wide area network (WAN). In one embodiment, memory 704 includes internal memory 114 (see FIG. 1). In another embodiment, memory 704 includes external memory card 116 (see FIG. 1). In yet another embodiment, memory 704 includes internal memory 114 (see FIG. 1) and external memory card 116 (see FIG. 1).

I/O interface 706 includes any system for exchanging information to or from an external source. I/O devices 710 include any known type of external device, including a display device, keyboard, etc. Bus 708 provides a communication link between each of the components in mobile device 102, and may include any type of transmission link, including electrical, optical, wireless, etc.

I/O interface 706 also allows mobile device 102 to store information (e.g., data or program instructions such as program code 714) on and retrieve the information from computer data storage unit 712 or another computer data storage unit (not shown). Computer data storage unit 712 includes a known computer-readable storage medium, which is described below. In one embodiment, computer data storage unit 712 is a non-volatile data storage device, such as a magnetic disk drive (i.e., hard disk drive) or an optical disc drive (e.g., a CD-ROM drive which receives a CD-ROM disk).

Memory 704 and/or storage unit 712 may store computer program code 714 that includes instructions that are carried out by CPU 702 via memory 704 to protect data owned by an operating system on mobile device 102 having multiple operating systems. Although FIG. 7 depicts memory 704 as including program code 714, the present invention contemplates embodiments in which memory 704 does not include all of code 714 simultaneously, but instead at one time includes only a portion of code 714.

Further, memory 704 includes operating systems OS 106 (see FIG. 1), OS 108 (see FIG. 1), . . . , OS 110 (see FIG. 1).

As will be appreciated by one skilled in the art, in a first embodiment, the present invention may be a system; in a second embodiment, the present invention may be a method; and in a third embodiment, the present invention may be a computer program product.

Any of the components of an embodiment of the present invention can be deployed, managed, serviced, etc. by a service provider that offers to deploy or integrate computing infrastructure with respect to protecting data owned by an operating system on mobile device 102 having multiple operating systems. Thus, an embodiment of the present invention discloses a process for supporting computer infrastructure, where the process includes providing at least one support service for at least one of integrating, hosting, maintaining and deploying computer-readable code (e.g., program code 714) in a computer system (e.g., mobile device 102) including one or more processors (e.g., CPU 702), wherein the processor(s) carry out instructions contained in the code causing the computer system to protect data owned by an operating system on mobile device 102 having multiple operating systems. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of protecting data owned by an operating system on mobile device 102 having multiple operating systems.

While it is understood that program code 714 for protecting data owned by an operating system on mobile device 102 having multiple operating systems may be deployed by manually loading directly in client, server and proxy computers (not shown) via loading a computer-readable storage medium (e.g., computer data storage unit 712), program code 714 may also be automatically or semi-automatically deployed into mobile device 102 by sending program code 714 to a central server or a group of central servers. Program code 714 is then downloaded into client computers (e.g., mobile device 102) that will execute program code 714. Alternatively, program code 714 is sent directly to the client computer via e-mail. Program code 714 is then either detached to a directory on the client computer or loaded into a directory on the client computer by a button on the e-mail that executes a program that detaches program code 714 into a directory. Another alternative is to send program code 714 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 714 is transmitted to the proxy server and then it is stored on the proxy server.

Another embodiment of the invention provides a method that performs the process steps on a subscription, advertising and/or fee basis. That is, a service provider can offer to create, maintain, support, etc. a process of protecting data owned by an operating system on mobile device 102 having multiple operating systems. In this case, the service provider can create, maintain, support, etc. a computer infrastructure that performs the process steps for one or more customers. In return, the service provider can receive payment from the customer(s) under a subscription and/or fee agreement, and/ or the service provider can receive payment from the sale of advertising content to one or more third parties.

The present invention may be a system, a method, and/or a computer program product. The computer program product may include a computer readable storage medium (or media) (memory 704 and computer data storage unit 712) having computer readable program instructions 714 thereon for causing a processor (e.g., CPU 702) to carry out aspects of the present invention.

The computer readable storage medium can be a tangible device that can retain and store instructions (e.g., program code 714) for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 714) described herein can be downloaded to respective computing/processing devices (e.g., mobile device 102) from a computer readable storage medium or to an external computer or external storage device (e.g., computer data storage unit 712) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 714) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 4 and FIGS. 5A-5B) and/or block diagrams (e.g., FIG. 1 and FIG. 7) of methods, apparatus (systems), and computer program products according to embodiments of the invention. It will be understood that each block of the flowchart illustrations and/ or block diagrams, and combinations of blocks in the flowchart illustrations and/or block diagrams, can be implemented by computer readable program instructions (e.g., program code 714).

These computer readable program instructions may be provided to a processor (e.g., CPU 702) of a general purpose computer, special purpose computer, or other programmable data processing apparatus (e.g., mobile device 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 712) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 714) may also be loaded onto a computer (e.g. mobile device 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of protecting data owned by an operating system on a mobile computing device having multiple operating systems, the method comprising the steps of:
    a computer generating a map specifying protected data regions for the operating systems on the mobile computing device;
    the computer securing at least a portion of the map with a shared key;
    based at least in part on the map and the shared key, and in response to a data cleanup activity being performed by a software utility being executed on another, currently running operating system included in the multiple operating systems, the computer determining a data region included in the protected data regions is owned by the operating system;
    based on the data region being owned by the operating system and the data region being specified by the map, the computer blocking the data cleanup activity from being performed on the data region owned by the operating system;
    the computer determining a first disk identifier, a first start offset and a first end offset of the data region, the first disk identifier identifying the data region as being in an internal memory or in an external memory card of the mobile computing device, and the first start and first end offsets specifying start and end memory locations, respectively, of the data region;
    the computer retrieving a list of the protected data regions specified by the map;
    the computer selecting a protected data region in the list and determining a second disk identifier of the selected protected data region, a second start offset and a second end offset of the selected protected data region, the second disk identifier identifying the selected protected data region as being in the internal memory or in the external memory card of the mobile computing device, and the second start and second end offsets specifying start and end memory locations, respectively, of the selected protected data region; and
    the computer determining the first and second disk identifiers match and determining the first start and first end offsets are within boundaries indicated by the second start and second end offsets, wherein the step of determining the data region is owned by the operating system is based in part on the first disk identifier matching the second disk identifier and the first start and first end offsets being within the boundaries indicated by the second start and second end offsets.

2. The method of claim 1, further comprising the step of in response to the data cleanup activity being performed by the software utility being executed on the other, currently running operating system, the computer determining the data region is not owned by the currently running operating system, wherein the step of determining the data region is owned by the operating system is based in part on the data region being not owned by the currently running operating system.

3. The method of claim 1, further comprising:
    the computer obtaining a user identifier from a user of the mobile computing device;
    based on the user identifier, the computer retrieving the shared key from a data structure in the internal memory of the mobile computing device; and
    based on the retrieved shared key, the computer retrieving from the data structure a tuple specifying the data region, wherein the step of determining the data region is owned by the operating system is based in part on the shared key being retrieved from the data structure and the tuple specifying the data region being retrieved from the data structure.

4. The method of claim 1, further comprising:
    the computer detecting a second data region as being not owned by the currently running operating system;
    the computer determining a disk identifier, a start offset and an end offset of the second data region, the disk identifier of the second data region identifying the second data region as being in the internal memory of the mobile computing device or in the external memory card of the mobile computing device, and the start and end offsets of the second data region indicating start and end memory locations, respectively, of the second data region;

the computer determining the disk identifier does not match any corresponding disk identifier of any data region included in the protected data regions and determining the start and end offsets of the second data region are not within boundaries indicated by any start and end offsets of any data region included in the protected data regions, and in response, determining the second data region is not owned by the operating system or by any other operating system of the multiple operating systems that are not currently running in the mobile computing device; and based on the second data region being not owned by the operating system or by any other operating system of the multiple operating systems that are not currently running in the mobile computing device, the computer completing the data cleanup activity to delete data in the second data region.

5. The method of claim 1, wherein the step of generating the map specifying the protected data regions for the operating systems on the mobile computing device includes the steps of:

the computer receiving a disk identifier, a start offset and an end offset of a new data region;

the computer determining the new data region is a first data region to be included in the protected data regions;

based on the new data region being the first data region to be included in the protected data regions, the computer generating a key specific to the operating system;

based on the new data region being the first data region to be included in the protected data regions, the computer generating a write key specific to the operating system and the shared key;

based on the new data region being the first data region to be included in the protected data regions, the computer finding an unallocated region in the internal memory in the mobile computing device;

based on the new data region being the first data region to be included in the protected data regions, receiving a user identifier key from a user of the mobile computing device;

based on the user identifier key, the computer updating a first data structure in the internal memory in the mobile computing device with the shared key and an offset of a second data structure in the internal memory;

the computer locking the new data region with the key specific to the operating system; and based on the write key, the computer updating the map with the disk identifier, the start offset and the end offset of the new data region, which indicate the new data region is added to the protected data regions.

6. The method of claim 1, wherein the step of generating the map specifying the protected data regions for the operating systems on the mobile computing device includes the steps of:

the computer receiving a disk identifier, a start offset and an end offset of a new data region;

the computer determining the new data region is not a first data region to be included in the protected data regions;

based on the new data region not being the first data region to be included in the protected data regions, the computer locking the new data region with a key specific to the operating system; and based on a key generated for another data region added to the protected data regions, the computer updating the map with the disk identifier, the start offset and the end offset of the new data region, which indicate the new data region is added to the protected data regions.

7. The method of claim 1, further comprising providing at least one support service for at least one of creating, integrating, hosting, maintaining, and deploying computer-readable program code in the computer, the program code being executed by a processor of the computer to implement the steps of generating, securing, determining the data region is owned by the operating system, blocking, determining the first disk identifier, the first start offset, and the first end offset of the data region, retrieving, selecting, determining the second disk identifier, the second start offset, and the second end offset of the selected protected data region, and determining the first start and end offsets are within the boundaries indicated by the second start and second end offsets.

8. A computer program product, comprising:

a computer-readable, storage device; and a computer-readable program code stored in the computer-readable, storage device, the computer-readable program code containing instructions that are carried out by a central processing unit (CPU) of a computer system to implement a method of protecting data owned by an operating system on a mobile computing device having multiple operating systems, the method comprising the steps of:

the computer system generating a map specifying protected data regions for the operating systems on the mobile computing device;

the computer system securing at least a portion of the map with a shared key;

based at least in part on the map and the shared key, and in response to a data cleanup activity being performed by a software utility being executed on another, currently running operating system included in the multiple operating systems, the computer system determining a data region included in the protected data regions is owned by the operating system;

based on the data region being owned by the operating system and the data region being specified by the map, the computer system blocking the data cleanup activity from being performed on the data region owned by the operating system;

the computer system determining a first disk identifier, a first start offset and a first end offset of the data region, the first disk identifier identifying the data region as being in an internal memory or in an external memory card of the mobile computing device, and the first start and first end offsets specifying start and end memory locations, respectively, of the data region;

the computer system retrieving a list of the protected data regions specified by the map;

the computer system selecting a protected data region in the list and determining a second disk identifier of the selected protected data region, a second start offset and a second end offset of the selected protected data region, the second disk identifier identifying the selected protected data region as being in the internal memory or in the external memory card of the mobile computing device, and the second start and second end offsets specifying start and end memory locations, respectively, of the selected protected data region; and the computer system determining the first and second disk identifiers match and determining the first start and first end offsets are within boundaries indicated by the second start and second end offsets, wherein the step of determining the data region is owned by the operating system is based in part on the first disk identifier matching the second disk identifier and the first start and first end offsets being within the boundaries indicated by the second start and second end offsets.

9. The computer program product of claim 8, wherein the method further comprises the step of in response to the data cleanup activity being performed by the software utility being executed on the other, currently running operating system, the computer system determining the data region is not owned by the currently running operating system, wherein the step of determining the data region is owned by the operating system is based in part on the data region being not owned by the currently running operating system.

10. The computer program product of claim 8, wherein the method further comprises:
the computer system obtaining a user identifier from a user of the mobile computing device;
based on the user identifier, the computer system retrieving the shared key from a data structure in the internal memory of the mobile computing device; and
based on the retrieved shared key, the computer system retrieving from the data structure a tuple specifying the data region, wherein the step of determining the data region is owned by the operating system is based in part on the shared key being retrieved from the data structure and the tuple specifying the data region being retrieved from the data structure.

11. The computer program product of claim 8, wherein the method further comprises:
the computer system detecting a second data region as being not owned by the currently running operating system;
the computer system determining a disk identifier, a start offset and an end offset of the second data region, the disk identifier of the second data region identifying the second data region as being in an internal memory of the mobile computing device or in the external memory card of the mobile computing device, and the start and end offsets of the second data region indicating start and end memory locations, respectively, of the second data region;
the computer system determining the disk identifier does not match any corresponding disk identifier of any data region included in the protected data regions and determining the start and end offsets of the second data region are not within boundaries indicated by any start and end offsets of any data region included in the protected data regions, and in response, determining the second data region is not owned by the operating system or by any other operating system of the multiple operating systems that are not currently running in the mobile computing device; and
based on the second data region being not owned by the operating system or by any other operating system of the multiple operating systems that are not currently running in the mobile computing device, the computer system completing the data cleanup activity to delete data in the second data region.

12. The computer program product of claim 8, wherein the step of generating the map specifying the protected data regions for the operating systems on the mobile computing device includes the steps of:
the computer system receiving a disk identifier, a start offset and an end offset of a new data region;
the computer system determining the new data region is a first data region to be included in the protected data regions;
based on the new data region being the first data region to be included in the protected data regions, the computer system generating a key specific to the operating system;
based on the new data region being the first data region to be included in the protected data regions, the computer system generating a write key specific to the operating system and the shared key;
based on the new data region being the first data region to be included in the protected data regions, the computer system finding an unallocated region in the internal memory in the mobile computing device;
based on the new data region being the first data region to be included in the protected data regions, receiving a user identifier key from a user of the mobile computing device;
based on the user identifier key, the computer system updating a first data structure in the internal memory in the mobile computing device with the shared key and an offset of a second data structure in the internal memory;
the computer system locking the new data region with the key specific to the operating system; and
based on the write key, the computer system updating the map with the disk identifier, the start offset and the end offset of the new data region, which indicate the new data region is added to the protected data regions.

13. A computer system comprising:
a central processing unit (CPU);
a memory coupled to the CPU; and
a computer readable storage device coupled to the CPU, the storage device containing instructions that are executed by the CPU via the memory to implement a method of protecting data owned by an operating system on a mobile computing device having multiple operating systems, the method comprising the steps of:
the computer system generating a map specifying protected data regions for the operating systems on the mobile computing device;
the computer system securing at least a portion of the map with a shared key;
based at least in part on the map and the shared key, and in response to a data cleanup activity being performed by a software utility being executed on another, currently running operating system included in the multiple operating systems, the computer system determining a data region included in the protected data regions is owned by the operating system;
based on the data region being owned by the operating system and the data region being specified by the map, the computer system blocking the data cleanup activity from being performed on the data region owned by the operating system;
the computer system determining a first disk identifier, a first start offset and a first end offset of the data region, the first disk identifier identifying the data region as being in an internal memory or in an external memory card of the mobile computing device, and the first start and first end offsets specifying start and end memory locations, respectively, of the data region;
the computer system retrieving a list of the protected data regions specified by the map;
the computer system selecting a protected data region in the list and determining a second disk identifier of the selected protected data region, a second start offset and a second end offset of the selected protected data region, the second disk identifier identifying the selected protected data region as being in the internal memory or in the external memory card of the mobile computing device, and the second start and second end offsets specifying start and end memory locations, respectively, of the selected protected data region; and the computer system determining the first and second disk identifiers match and determining the first start and first end offsets are within boundaries indicated by the second start and second end offsets, wherein the step of determining the data region is owned by the operating system is based in part on the first disk identifier matching the second disk identifier and the first start and first end offsets being within the boundaries indicated by the second start and second end offsets.

14. The computer system of claim 13, wherein the method further comprises the step of in response to the data cleanup activity being performed by the software utility being executed on the other, currently running operating system, the computer system determining the data region is not owned by the currently running operating system, wherein the step of determining the data region is owned by the operating system is based in part on the data region being not owned by the currently running operating system.

15. The computer system of claim 13, wherein the method further comprises:
the computer system obtaining a user identifier from a user of the mobile computing device;
based on the user identifier, the computer system retrieving the shared key from a data structure in the internal memory of the mobile computing device; and
based on the retrieved shared key, the computer system retrieving from the data structure a tuple specifying the data region, wherein the step of determining the data region is owned by the operating system is based in part on the shared key being retrieved from the data structure and the tuple specifying the data region being retrieved from the data structure.

16. The computer system of claim 13, wherein the method further comprises:
the computer system detecting a second data region as being not owned by the currently running operating system;
the computer system determining a disk identifier, a start offset and an end offset of the second data region, the disk identifier of the second data region identifying the second data region as being in the internal memory of the mobile computing device or in the external memory card of the mobile computing device, and the start and end offsets of the second data region indicating start and end memory locations, respectively, of the second data region;

the computer system determining the disk identifier does not match any corresponding disk identifier of any data region included in the protected data regions and determining the start and end offsets of the second data region are not within boundaries indicated by any start and end offsets of any data region included in the protected data regions, and in response, determining the second data region is not owned by the operating system or by any other operating system of the multiple operating systems that are not currently running in the mobile computing device; and based on the second data region being not owned by the operating system or by any other operating system of the multiple operating systems that are not currently running in the mobile computing device, the computer system completing the data cleanup activity to delete data in the second data region.

17. The computer system of claim 13, wherein the step of generating the map specifying the protected data regions for the operating systems on the mobile computing device includes the steps of:
the computer system receiving a disk identifier, a start offset and an end offset of a new data region;
the computer system determining the new data region is a first data region to be included in the protected data regions;
based on the new data region being the first data region to be included in the protected data regions, the computer system generating a key specific to the operating system;
based on the new data region being the first data region to be included in the protected data regions, the computer system generating a write key specific to the operating system and the shared key;
based on the new data region being the first data region to be included in the protected data regions, the computer system finding an unallocated region in the internal memory in the mobile computing device;
based on the new data region being the first data region to be included in the protected data regions, receiving a user identifier key from a user of the mobile computing device;
based on the user identifier key, the computer system updating a first data structure in the internal memory in the mobile computing device with the shared key and an offset of a second data structure in the internal memory;
the computer system locking the new data region with the key specific to the operating system; and
based on the write key, the computer system updating the map with the disk identifier, the start offset and the end offset of the new data region, which indicate the new data region is added to the protected data regions.

* * * * *